United States Patent [19]
Breda et al.

[11] Patent Number: 5,501,549
[45] Date of Patent: Mar. 26, 1996

[54] PULLING AND CONNECTING TOOL FOR SUBSEA CONDUITS

[75] Inventors: Jøren Breda, Asker; Jens Bakke; Sverre Caspersen, both of Oslo, all of Norway

[73] Assignee: Kvaerner Energy a.s, Oslo, Norway

[21] Appl. No.: 256,845

[22] PCT Filed: Feb. 10, 1993

[86] PCT No.: PCT/NO93/00024

§ 371 Date: Jul. 26, 1994

§ 102(e) Date: Jul. 26, 1994

[87] PCT Pub. No.: WO93/16267

PCT Pub. Date: Aug. 19, 1993

[30] Foreign Application Priority Data

Feb. 10, 1992 [NO] Norway .................................. 920518

[51] Int. Cl.⁶ .................................................. F16L 1/12
[52] U.S. Cl. ........................ 405/169; 405/191; 166/338; 166/343; 166/347
[58] Field of Search ................................ 405/169, 191, 405/195.1; 166/338, 343, 347

[56] References Cited

U.S. PATENT DOCUMENTS

| | | | |
|---|---|---|---|
| RE. 31,265 | 6/1983 | Sinclair et al. | 405/169 |
| 3,973,625 | 8/1976 | Baugh | 166/343 |
| 4,024,724 | 5/1977 | Horton | 405/169 |
| 4,161,367 | 7/1979 | Cuiper et al. | 166/343 X |
| 4,315,702 | 2/1982 | Moe et al. | 405/169 X |
| 4,329,085 | 5/1982 | Morrill et al. | 166/338 X |
| 4,457,378 | 7/1984 | Watkins | 166/343 X |
| 4,563,032 | 1/1986 | Knowles | 294/90 |
| 4,682,913 | 7/1987 | Shatto et al. | 405/169 |
| 4,878,783 | 11/1989 | Baugh | 405/169 |
| 4,906,136 | 3/1990 | Norbom et al. | 405/191 X |

*Primary Examiner*—Roger J. Schoeppel
*Attorney, Agent, or Firm*—Young & Thompson

[57] ABSTRACT

A tool for the remote-controlled pulling, aligning and connecting of a subsea conduit to a subsea installation. The tool includes a framework, a pulling wire with a pulling head which can be releasably attached to the end of the subsea conduit and also optionally aligning means which bring the ends of the conduit which are to be connected in line with one another. The tool has a frame pivotally mounted on the framework around a substantially horizontal axis oriented substantially at right angle to the axis of the conduit and at almost the same height at which the conduit will finally lie, said frame including a grip elevator which can grip and hold the pulled conduit and manipulate the end of the conduit between a slanting pulling position and a final substantially horizontal connecting position.

7 Claims, 5 Drawing Sheets

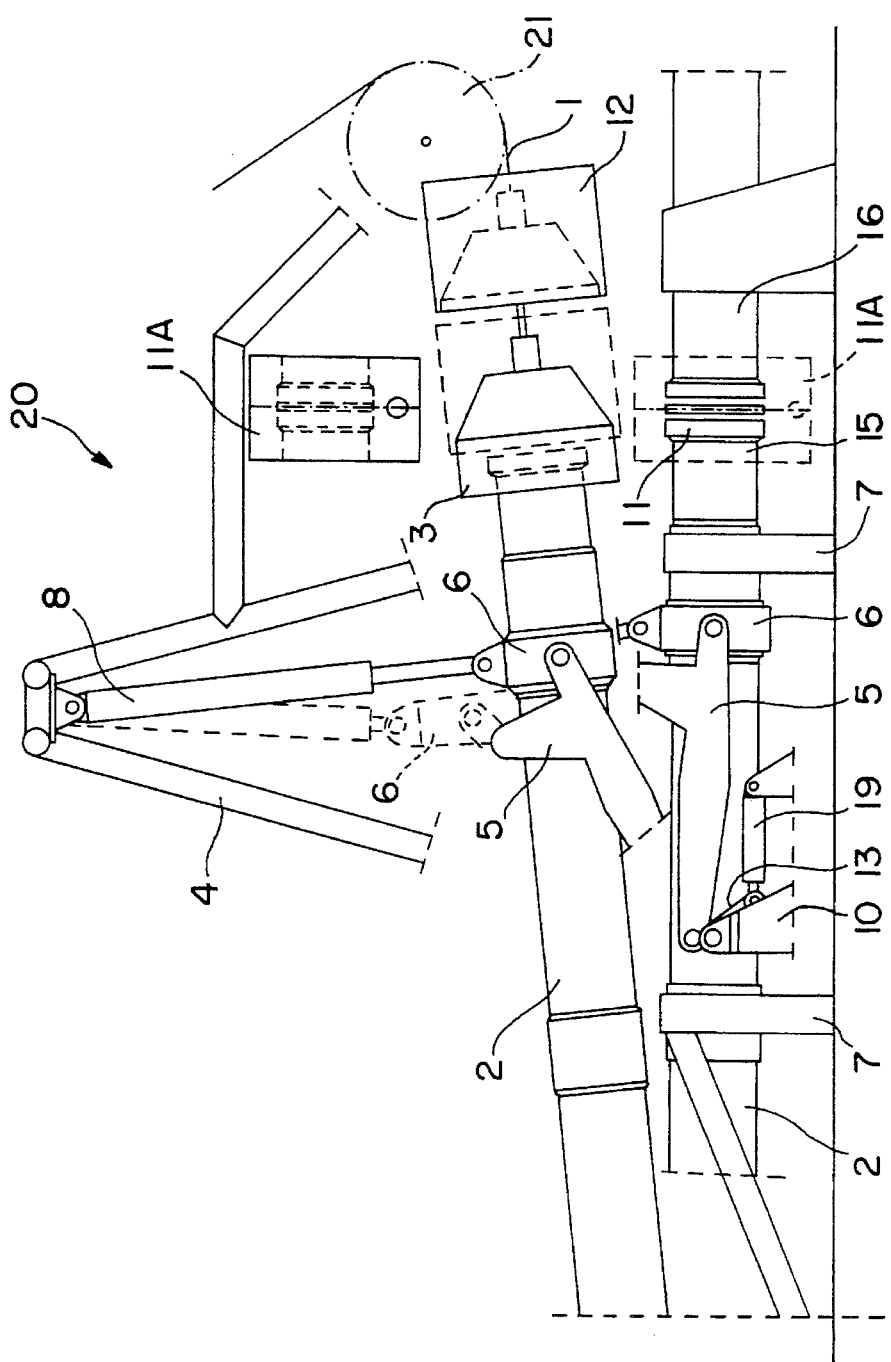

PULLING AND CONNECTING TOOL FOR SUBSEA CONDUITS

The present invention relates to a tool for the remote-controlled pulling, aligning and connecting of a subsea conduit to a subsea installation, said tool comprising a framework, a pulling wire having a pulling head which can be releasably attached to the end of the subsea conduit and aligning means which bring the ends of the conduit which are to be connected in line with one another.

The tool is designed for the remote-controlled fitting of a subsea conduit to an oil well, subsea production plant, or similar sea-floor installation. The conduit may consist of a single pipe, a plurality of pipes surrounded by a common sheath, or a plurality of individual pipes which end up in a common end piece. Usually an elevator and thread connection is used between the end of the conduit and the continuation thereof in the sea-floor installation, but this type of connection must not be considered as a limitation.

A previously known assembly procedure for laying a subsea conduit on the sea bed is as follows:

One end of the conduit is placed at a suitable distance from and in the correct orientation relative to the sea-floor installation. A pulling wire has at one end a pulling head which is attached to the end of the subsea conduit. The end of the subsea conduit and the sealing surfaces thereof and the system for the connection can moreover be protected by a sheath. The wire is brought to the installation vessel and is fed through the pulling tool which is on board the vessel. The tool is then lowered to the sea bed and is locked on to the sea-floor installation. In order to guide the tool during the running down and retrival operation, wires are extended between guide posts on the sea-floor installation and the installation vessel. The subsea conduit is pulled by means of the pulling wire by a winch which can be positioned on the vessel. In deep waters and when the conduits are long or of large dimensions, the resilience or elasticity in a long pulling wire may cause problems. In such cases, the winch can be placed on the tool, or, in order to save time, the winch on the vessel can be used until the forces become too great, and thereafter the last step of the pulling is carried out by a stronger but slower winch on the tool.

If the conduit consists of several interconnections, it must be oriented. This takes place in that the conduit is pulled through a funnel having a double slot which forces the conduit to turn around the axis of the funnel until the conduit is oriented correctly. The conduit must also be straigthened so that the angle between itself and the continuation thereof on the sea-floor installation is within the tolerance levels of the connection. In the case of small conduits, the pulling head can be placed eccentric relative to the centre line of the conduit, and thus the conduit can be pulled forward until it is in the correct position relative to the flange to which it is to be connected. Furthermore, the funnel and the pulling head can be designed with a limited clearing and sufficient length to force the conduit into the correct angle. The connection can be tightened whilst the conduit is held by the pulling wire, thereby carrying out the pulling and the connecting by the use of one tool only.

The forces and torques which occur during pulling and aligning increase greatly, however, as the diameter of the conduit increases. In the case-of conduits of large dimensions, an eccentric positioning of the pulling head will subject the structures to further forces and torques and result in unrealistically rough dimensions of the materials used in the pulling head and the tool.

Also in the case of flexible conduits, an eccentric positioning of the pulling head will cause great problems because the conduit will bend.

It would be possible to achieve a symmetric pull by using two pulling wires. This principle has been used for pulling flexible risers to floating platforms, but the use of two pulling wires has been considered too complicated for use on subsea installations.

In the case of conduits of large dimensions, it is preferable to attach the wire in line with the centre line of the conduit. This means, however, that the conduit cannot be pulled further than the length dimensions of the pulling head and the running pulley for the wire allow, and that the pulling wire must be relieved of tension and these elements removed before the connection can be brought into place and tightened. Since the pulling and connecting elements occupy the same place, another consequence will be that it will be difficult to combine these in one tool.

In the further description of the prior art, it is a prerequisite that the wire is attached in line with the centre line of the conduit and that two tools are used, one pulling tool and one connecting tool.

Whilst the wire is tightened, a second connection is brought in between the conduit and the tool in engagement, in such a way that the wire can be relieved of tension. The pulling head and the pulley are thereafter moved away. The pulling tool then guides the conduit axially forwards until the end of the conduit is in the correct position for connecting within the tolerances that the connection itself requires. The length of the stroke which is required for this last step of the pulling is determined by the size of the pulling head and the pulley for the pulling wire which is between the flanges, and is therefore relatively large, typically three to four times the diameter of the pipe. Since the forces which are to be transferred also are great, the dimensions of these elements and the operating means thereof are rough. The pulling tool locks the conduit on to the sea-floor installation. In this position, forces and torques are transferred from the conduit direct to said sea-floor installation and the tool is relieved of tension. The pulling head with the wire is removed from the conduit and the pulling tool is retrieved up to the installation vessel.

At this stage the two ends of the conduit are concentric. The distance between the flanges thereof is approximately equal to the thickness of the sealing element when the pipes are free from tension. It must be possible to press the flanges sufficiently apart from one another for the connection elements to be fed therebetween in that one of the pipes is made so as to be resilient or elastic. The pipe that has been pulled into position is locked into position and the forces which are transferred through the lock are great and dependent upon friction against the seabed and other variable conditions. Flexibility ought therefore to be built into the pipe system fitted to the sea-floor installation.

The connecting tool is lowered and locked on to the sea-floor installation. The connecting tool then grips both flanges and presses them apart. The pipe system on the sea-floor installation accommodates the movement elastically. The tool removes the protective sheaths and puts the connecting mechanism with the sealing element in place, whereupon the connection is tightened and checked for leakage. Thereafter the connecting tool is retrieved up to the surface.

One objective of the present invention is to be able to carry out the pulling and the connecting with a single combined tool which also can be used for conduits of large dimensions. Since it is the preparations and the running down and retrieving of the tool that take up most of the time needed for the operations, the use of one tool instead of two will mean a reduction of almost 50% of the time required, and consequently almost 50% of the cost incurred.

This is accomplished according to the invention with one tool of the type described by way of introduction which is characterized by a frame pivotally mounted on a framework around a substantially horizontal axis oriented substantially at right angle to the axis of the conduit and at almost the same height as the height at which the conduit will finally lie, said frame comprising a grip elevator which can grip and hold the pulled conduit and manipulate the end of the conduit between the slanting pulling position and a final substantially horizontal connecting position.

Explained in simple terms, the objective is thus attained in that the conduit is pulled at a higher level in order to be pivoted down to the final level, thereby avoiding any conflict between the pulling and connecting operations.

In addition the frame can be displaceably parallel to a longitudinal axis of an aligned conduit in order optionally to bring the ends of the conduit closer to/further from one another.

It would be of advantage for an actuating cylinder to manipulate the grip elevator between the two extreme positions thereof.

The pivotable frame can be a split funnel means (FIG. 4) which orients the end of the conduit around its centre axis when rotational orientation is required. This will be the case when a subsea conduit is composed of several smaller pipes which transport different fluids for different purposes.

The tool can also comprise a reception bay or garage for arresting and parking the pulling head.

It should be understood that during the pulling step the frame is at such an angle that it does not interfere with the conduit when said conduit is pulled. The pivotable frame is, as mentioned, equipped with a grip elevator which grips hold of the conduit and preferably has the form of profiles which correspond to profiles on the end of the pulled conduit. When the conduit has been fully pulled into place, the locking means are brought into engagement with the conduit, whereupon the pulling wire can be released somewhat so that the pulling forces are transferred to the pivotable frame and the pulling head can be disengaged and removed. By rotating thereafter the pivotable frame, the conduit is forced into engagement with the aligning means or housings on the sea-floor installation and will be concentric with the pipe system on said sea-floor installation to which the conduit is to be connected, and with the distance between the flanges that the sealing element requires. The conduit may optionally be moved along its own axis until both flanges are in contact whereupon the connection can be tightened.

Other and further objectives, features and advantages will be made clear in the following description of the embodiments of the invention preferred at present, which are given for descriptive purposes without thereby being restrictive and which are disclosed with reference to the enclosed drawings where:

FIG. 1 shows a schematic side outline of the tool where the subsea conduit is illustrated in two situations, viz., the conduit during the pulling step in the upper, slanting position and the conduit in the final connecting step in the lower horizontal position.

FIG. 2 shows the front view of the grip elevator.

FIG. 3 shows the front view of an aligning means.

Figure 4:
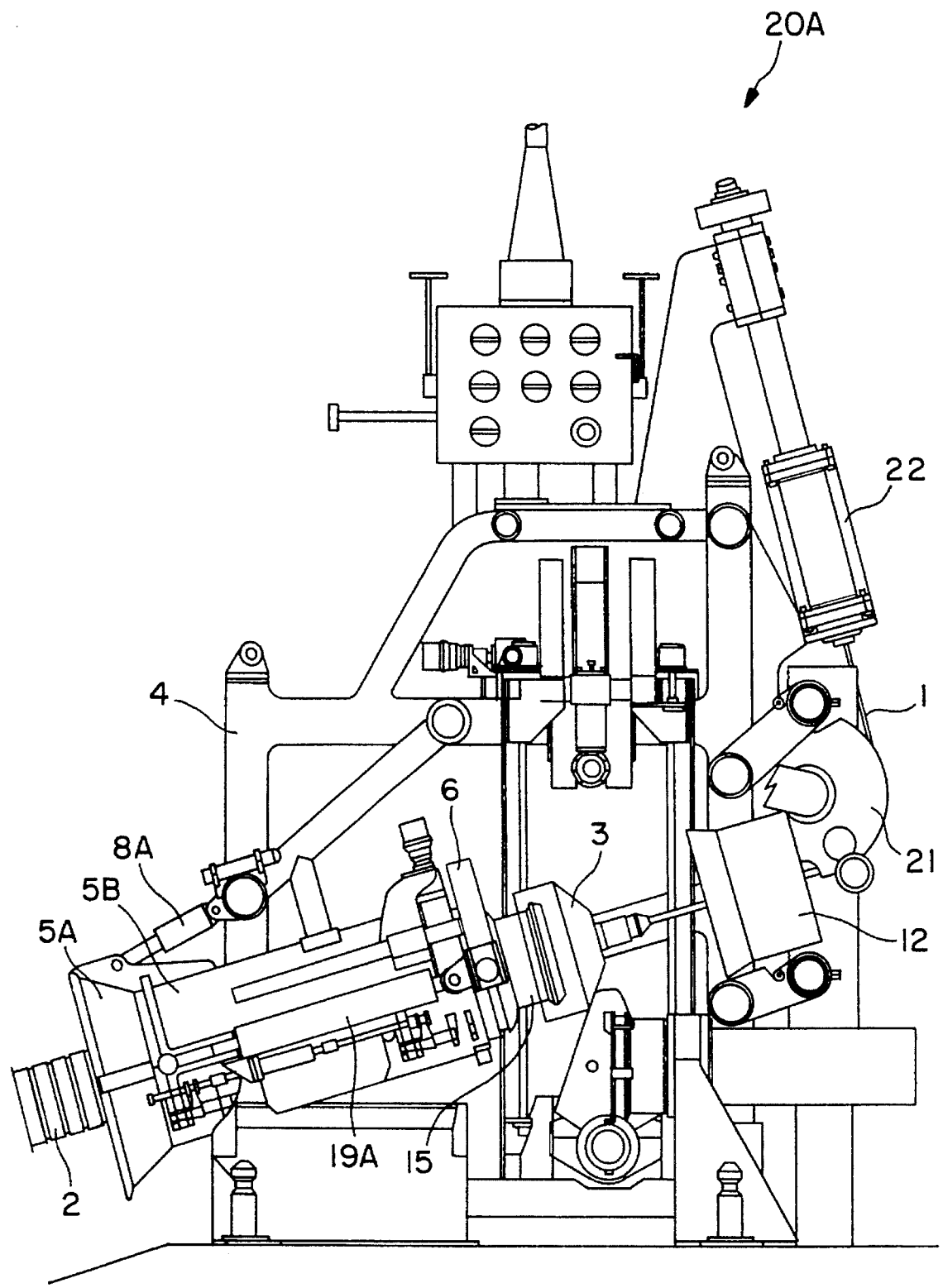
FIG. 4 illustrates a tool as is shown in FIG. 1, but which is especially designed for a flexible conduit which requires rotational orientation.

FIG. 1 shows in particular an embodiment designed to handle a rigid pipeline 2, ie, a conduit 2, the bending radius of which should not be less than approx. 50 times the external diameter of the conduit. The tool 20 comprises a pulling wire 1 which runs over a pulley 21 and further on to a winch (not shown). The tool 20 comprises a framework 4 which supports the various parts of the tool. A pivotable frame 5 is secured to and mounted on the framework 4 and is built in the form of a horseshoe with the opening pointing downwards. The pivotable frame 5, and thus the conduit 2, is shown in two positions in FIG. 1. In the upper position, the conduit 2 is shown at the end of the pulling operation with the pulling wire 1 taut. The pulling wire 1 ends, in a known way, in a pulling head 3, the internal configuration of which corresponds to the end of the conduit, eg, a flange. The second position shows the conduit 2 in a substantially horizontal position where the conduit 2 has been brought in line with the pipe end 16 to which the end 15 of the conduit is to be connected. In this position, the conduit 2 lies in the horseshoe-shaped aligning means 7 which are secured to the actual sea-floor installation. A grip elevator 6 is rotatably mounted on the pivotable frame 5 and is built like a horseshoe with profiles which correspond to one end of the pulled conduit 2. The grip elevator 6 can move substantially vertically by means of one or two hydraulic cylinders 8. As mentioned previously, the pulling head 3 envelops the end of the pulled conduit 2 and thus constitutes the releasable connection between said conduit 2 and the pulling wire 1. In addition, the pulling head 3 can also have a connection to the tool in order to be able to pressure test the conduit 2 prior to connection.

The framework 4 is further equipped with guides for the conduit 2 which shall be pulled into place, guide wires and posts, devices for locking the tool in a working position on the sea-floor installation, power cables and other cables leading to the installation vessel and other elements which are not shown.

The tool can comprise a connection assembly 11A which in FIG. 1 is shown in two positions. Prior to use, it is secured in an upper position, out of the way of the pulling equipment. After the conduit 2 has been been pulled into place and the pulling head 3 has been detached, the connection assembly 11A is submerged until it can be fed onto the end of the pulled conduit 2, and accompanies said conduit whilst it is lowered into the horizontal position.

The pivotable frame 5 is secured to the framework 4 via a bearing 10. The embodiment or form depends upon the geometry of the actual connection 11 between the end 15 of the conduit and the pipe end 16. If this is such that the clearing between the flanges must be greater whilst the pulled conduit is lowered than what the connection assembly 11A is able to grip around, one of the pipes must be moved axially until the connecting can be carried out after the pulled conduit 2 has been placed in the aligning means 7 on the sea-floor installation. Here, it is a prerequisite either that the connection assembly 11A can be opened enough to reach around the diameter of the conduit so that only screws and a seal plate, which also function as spacers, must be passed between the flanges, or that the connection assembly 11A can be fed axially over the pulled conduit 2 whilst the seal plate passes between the flanges.

A known type of connection assembly consists of three segments which are hinged to one another above axes which extend in the longitudinal axis of the conduit. The segments can be forced apart by means of a screw or jacking screw which extends transverse to the longitudinal axis of the conduit. It must be possible to place said jacking screw between the pipe flanges during assembly. In the uppermost outline of the connection assembly 11A in FIG. 1 the holes for the jacking screw are shown. It should be understood that the connection assembly 11A brings the seal plate with it down to the pipe flanges. It is the slanting surfaces on the flanges and the corresponding slanting surfaces inside the connection assembly 11A that pull the flanges towards one another when the jacking screw is tightened. A connection of this kind is taught in NO 159.555.

The axial movement that is required in the shown embodiment is as much as 140 mm and this can be achieved in that the frame 5, which is connected in an articulated manner to the support 10, is capable of being moved by means of levers 13 and two hydraulic cylinders 19. When these are actuated, the articulated frame 5 will move axially towards the right in the figure so that connection 11 is closed.

FIG. 2 shows the grip elevator 6 in more detail. A conduit 2 is shown held in the grip elevator 6. Two articulated arms 9 can be operated by means of actuating cylinders to hold or to release the conduit 2. The right and left articulated arms 9 show the grip elevator 6 in a gripping and releasing position, respectively.

FIG. 3 shows an aligning means 7 in more detail. As already mentioned, the means 7 has the form of a horseshoe which faces upwards in order to support the conduit 2.

A pulling procedure by means of the tool according to FIGS. 1 to 3 will now be described.

In FIG. 1 the grip elevator 6 is drawn in three positions. In the upper position, indicated in a dotted line, the grip elevator 6 is completely out of the path of the pulling head 3 and the conduit 2 whilst said conduit 2 is pulled into place.

In the mid position, the grip elevator 6 has been lowered so that it comes into engagement with profiles on the end of the pulled conduit 2. The articulated arms 9 on the grip elevator 6 can be rotated so that they support the pulled conduit 2 from below when the pulling wire 1 is relieved of tension. If the pulled conduit is not rotationally symmetric and must be rotated about its own axis before the connection can be carried out, the grip elevator 6 will be extended towards the left in a funnel having slots, and the end piece on the pulled conduit must be equipped with corresponding guiding lugs. It would be of advantage that the torque and the axial force which occur during this operation be fed directly into the framework 4 of the tool and not through the pivotable frame 5 and the cylinders 8. In order to achieve this, the grip elevator 6 can be brought into contact with the surface of the framework 4 of the tool during this operation, by pulling by means of cylinders 19 via the levers 13 and the support 10 for the pivotable frame 5.

In some cases, it may be desirable to pull the conduit to a point beyond it final position in order to relieve the pulled conduit 2 of tension. This can also be done by pushing with the cylinders 19 via the levers 13 and the support 10 for the pivotable frame 5.

The funnel is a part of the tool and must be capable of being pulled up to the surface. In order to achieve this, the funnel can be split along the horizontal diameter, whereby only the upper half accompanies the tool to the surface. Alternatively, the funnel can have a C profile in cross-section and with an opening of approx. 120° at the bottom, large enough to enable the pulled conduit 2 to pass downwards. If the conduit 2 is formed so that it must be rotated through more than approx. ±90°, this alternative involves the rotation being carried out in two rounds: first a lug/slot combination which brings the orientation within ±90° and thereafter a movement that completes the rotation. It is however more usual for the conduit to be oriented within ±90° and then the funnel can be made correspondingly smaller.

In the lower position, the cylinders 8 are at the end of their stroke, and have thereby pressed the pulled conduit down into the aligning means 7 on the sea-floor installation, whereby the conduit is forced to lie concentric to the pipeline on the sea-floor installation within the tolerances that the connection 11 requires. Whilst the conduit 2 is lowered to the lower position, a possible torsional movement in the conduit 2 after orientation will be transferred through the pivotable frame 5 and the cylinder 8. The frame must therefore be formed so as to have sufficient torsional rigidity. As mentioned, the articulated arms can be rotated in under the conduit 2 in order to hold it after the pulling wire 1 has been relieved of tension. After the pulling head 3 has been detached from the conduit 2 it can be parked in a reception bay or garage 12. It is the winch that pulls the pulling head 3 to a rest, which determines how far the conduit 2 shall be pulled. Optionally, the conduit 2 can be pulled to a position beyond its final position in order to relieve it of tension forces. Thereafter the locking elevator 6 is brought into engagement and the wire 1 can be relieved of tension. The conduit 2 can be pressure tested whilst the pulling head 3 lies against the rest, since this position is well defined. After the wire 1 has been relieved of tension, the pulling head 3 can be detached and an optional blind flange on the end of the conduit 2 can be removed. The mechanism which performs these operations is known and is not shown in the figures.

There now follows a description of the pulling and connecting procedure by using the tool according to the invention on a rigid, rotationally symmetric conduit 2 of a large diameter. The first step is as previously described. The conduits are pulled into place by means of the pulling wire 1 until the pulling head 3 meets its rest on the framework 4 of the tool 20. No alignment is carried out other than what results from the geometrical limitations given by the tool and the sea-floor installation. The pivotable frame 5 is lowered until the grip elevator 6 engages with the end of the pulled conduit 2. The conduit 2 is pressure tested through connections that come into engagement when the pulling head 3 meets its rest. If the conduit, on coming to rest, has been pulled beyond its final position, the cylinders 19 are activated via the support 10 to bring the rotatble frame 5 into engagement. The support arms 9 are rotated inwards to take up the weight of the end of the conduit after the pulling wire 1 has been relieved of tension. The pulling wire 1 is relieved of tension and the pulling head 3 with optional blind flange at the end of the pulled conduit 2 is removed. These elements accompany the pulling wire 1 when it is pulled back to rest, so that it is out of the way of the connection assembly 11A. If necessary, to provide an open route for the connection assembly 11A the relieved pulling wire 1 can be lifted out of the rest and parked further away.

The connection assembly 11A is lowered from its storage place until it rests on the end of the pulled conduit 2. The cylinder 8 is activated, whereby the conduit 2 is forced down into the aligning means 7 on the sea-floor installation. The screw jack on the connection assembly 11A and the seal plate pass between the two flanges. Thus the conduit 2 is concentric with its continuation on the sea-floor installation, and the clearing between the flanges can be from 60 mm to 160 mm, depending upon the geometry and size of the seal plate and connection. If the conduit must be oriented and the pulling procedure is such that the conduit lies within approx. ±60° of the correct orientation, the end of the conduit 2 and one or both of the aligning means 7 can be formed so as to force the conduit to rotate until it is correctly oriented in its final position. The cylinders 19 on the support 10 are activated, whereby the pivotable frame 5, the grip elevator 6 and consequently the pulled conduit 2 are moved towards the right in FIG. 1 until the connection assembly 11A can grip and perform the final connection.

Figure 5:
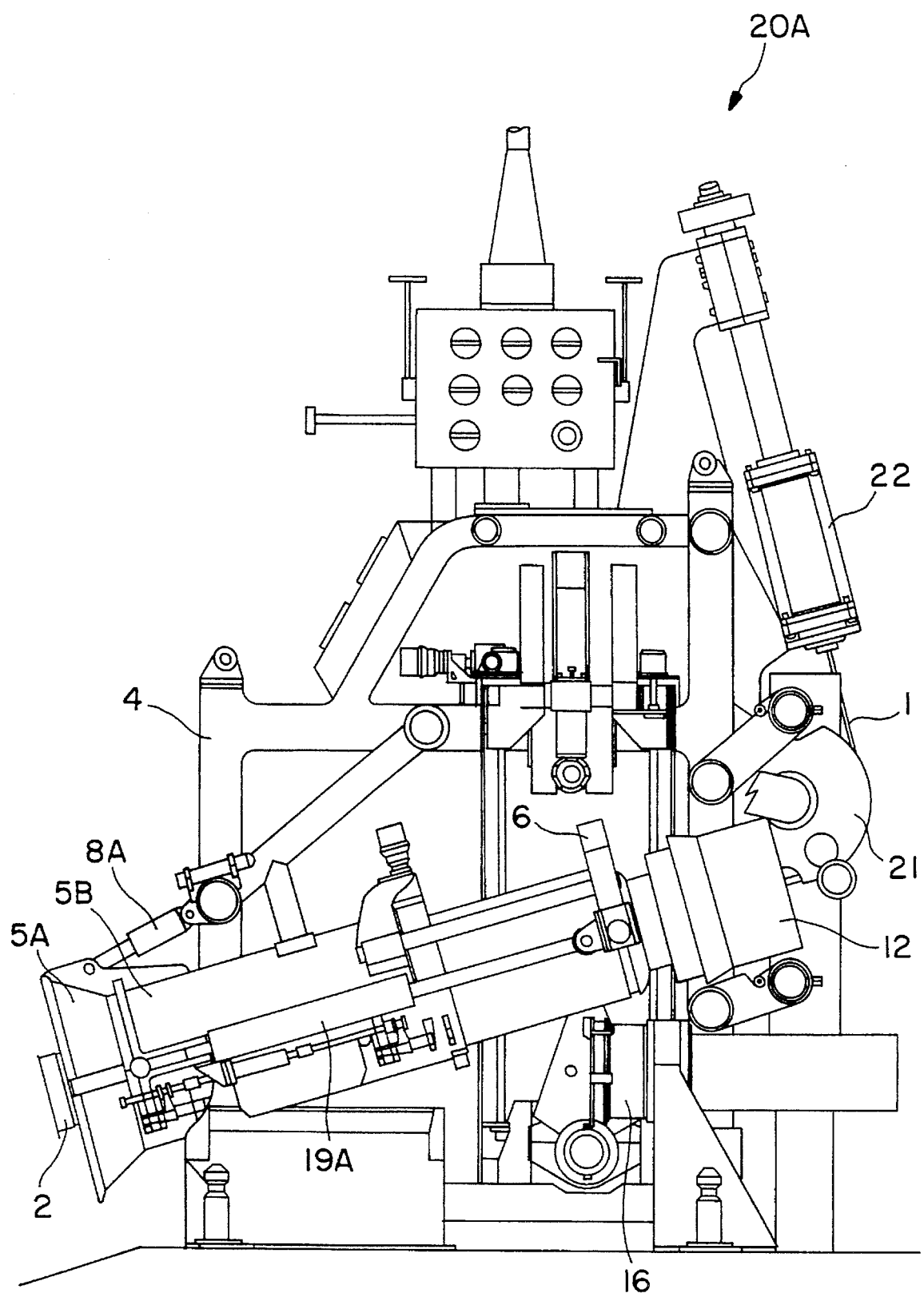
FIG. 5 shows the same tool as in FIG. 4 but in a situation where the flexible conduit has been completely pulled into place.
Figure 6:
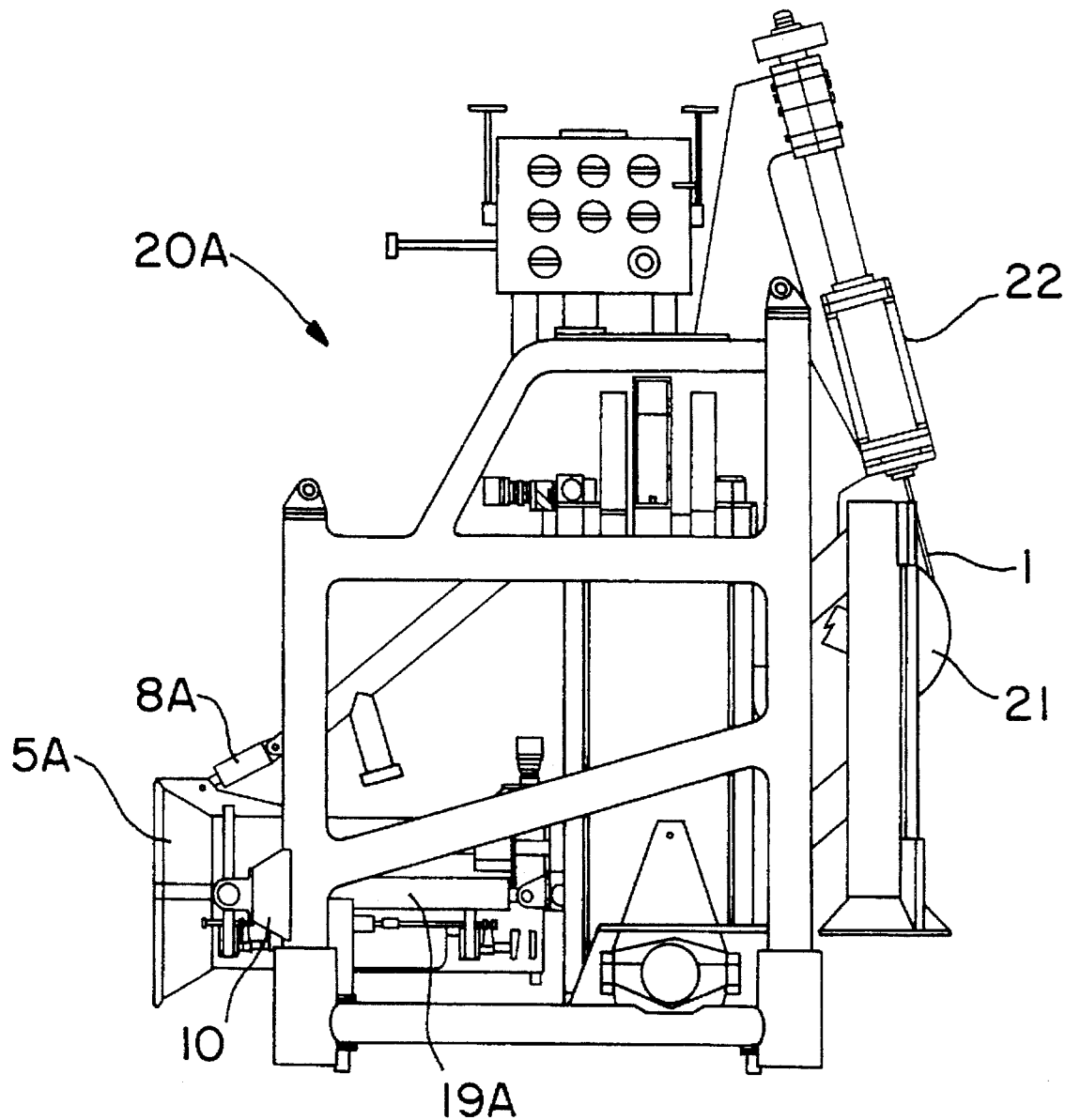
FIG. 6 is a further side outline of the tool according to FIG. 4.
Figure 7:
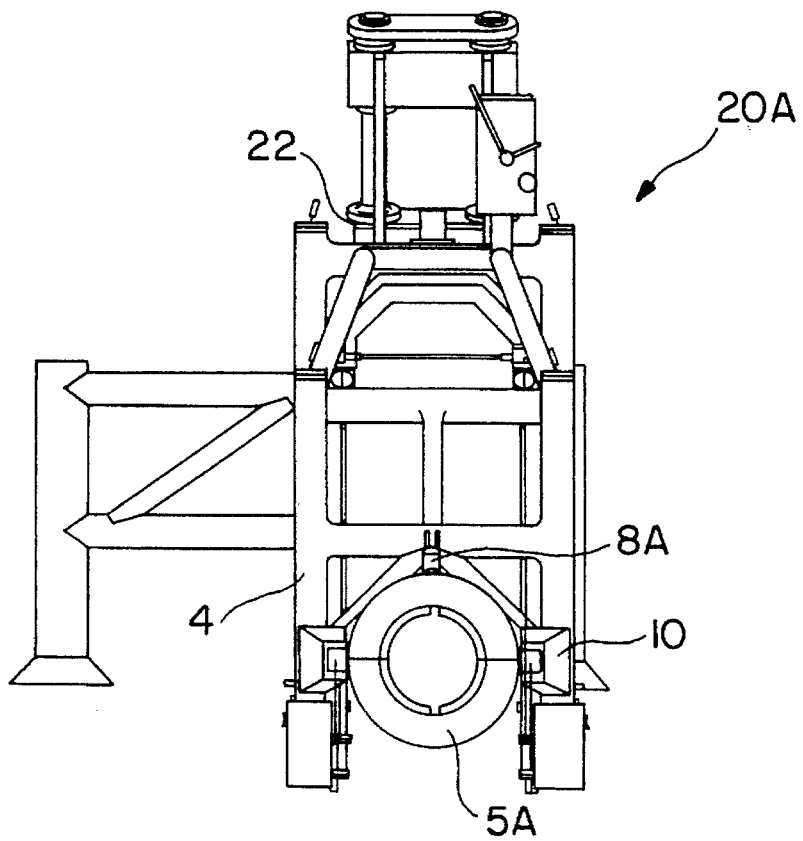
FIG. 7 shows a front outline of the tool shown in FIG. 4.
Figure 8:
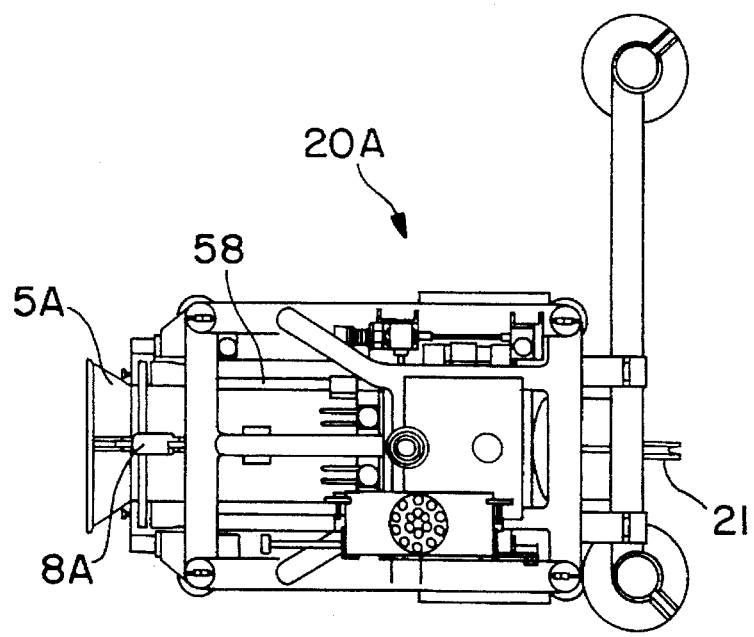
FIG. 8 shows an outline from above of the tool shown in FIG. 4.

The embodiment according to FIGS. 4 to 8 is especially designed for a flexible conduit 2 of average diameter, which requires rotational orientation. Here, it is equipped with a dividable funnel 5A which is constructed together with the pivotable frame 5B. The elements that reoccur in the embodiment according to FIGS. 1 to 3 and the embodiment according to FIGS. 4 to 8 and have the same function have been given the same reference numerals. The design has, however, been adapted to the properties of the flexible conduit.

The pulling system consists, as before, of a pulling wire 1, the pulley 21 and has now been equipped in addition with a linear winch 22. The pulling wire 1 is first pulled by means of a winch on the installation vessel and thereafter by means of the linear winch 22 which is mounted on the tool 20A itself. Since the conduit 2 must be oriented rotationally the pivotable frame 5B is equipped with slots in the funnel 5A. The conduit 2 here is so flexible that it will be concentric with the funnel 5A without generating bending moments of any significance for the dimensioning of the tool 20A. The articulated arms 9 here are formed so as to hold the lower part of the funnel 5A, until the conduit is at its final level. When the articulated arms 9 are opened once more, the lower part of the funnel 5A will be lying on the sea-floor installation.

The cylinder 8A, which rotates the pivotable frame 5 until the pulled conduit 2 is concentric with the pipeline on the sea-floor installation, is here placed near to the inlet of the funnel 5A. The frame 5 is rotatably held on the support 10 and is here formed with a cylinder 19A and guides which force the pulled conduit 2 to move axially during the pulling step so that the pulling head 3 will reach its garage 12, and later to bring the flanges into position so that the connection assembly 11A can effect a grip.

This embodiment of the tool is especially designed for a conduit the bending radius of which can be allowed to go down to approx. 10 times the external diameter of the conduit.

We claim:

1. A tool for the remote-controlled pulling, aligning and connecting of a subsea conduit to a subsea installation, said tool comprising a framework (4), a pulling wire (1) with a pulling head (3) which can be releasably attached to the end (15) of the subsea conduit and aligning means which bring the ends (15,16) of the conduit which are to be connected in line with one another, characterized by a frame (5,5B) pivotably mounted on the framework (4) around a substantially horizontal axis oriented substantially at right angle to the axis of the conduit (2) and at almost the same height as the height at which the conduit (2) will finally lie, said frame (5) comprising a grip elevator (6) which can grip and hold the pulled conduit (2) and manipulate the end (15) of the conduit (2) between a slanting pulling position and a final, substantially horizontal connecting position.

2. A tool according to claim 1, characterized in that the frame (5) is displaceably parallel to the longitudinal axis of an aligned conduit (2) optionally to enable the ends of the conduit (15,16) to be brought closer to/further from one another.

3. A tool according to claim 1, characterized in that an actuating cylinder (8) manipulates the grip elevator (6) between extreme positions.

4. A tool according to claim 1, characterized in that the pivotable frame (5B) comprises a split funnel means (5A) which orients the end of the conduit (15) around its centre axis when rotational orientation also is required.

5. A tool according to one claim 1, characterized in that it comprises a reception bay or garage (12) for arresting and parking the pulling head (3).

6. A tool according to claim 1, characterized in that it comprises a connection assembly (11A) which carries out the final connection between the ends (15,16) of the conduit.

7. A tool according to claim 1, characterized in that it comprises a linear winch (22) which pulls the pulling wire (1).

* * * * *